United States Patent Office 2,742,428
Patented Apr. 17, 1956

2,742,428
ORGANOPOLYSILOXANE LUBRICANTS

Maynard C. Agens, Schenectady, N. Y., assignor to General Electric Company, a corporation of New York No Drawing. Application March 23, 1950,
Serial No. 151,529

10 Claims. (Cl. 252—42.1)

The present invention relates to organopolysiloxanes having increased lubricity. More particularly, the invention is concerned with a composition of matter comprising a liquid organo-substituted polysiloxane, for example, a liquid, non-resinous organo-substituted polysiloxane containing an average of from about 1.9 to 2.67 organic groups per silicon atom, and having incorporated therein an aliphatic compound containing both chlorine and fluorine atoms. The invention also embraces methods for making such compositions of matter.

Liquid organo-substituted polysiloxanes are compositions comprising essentially silicon atoms connected to one another by oxygen atoms as illustrated by the following structure called a siloxane structure:

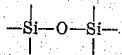

wherein a preponderant number of the valences of the silicon atoms are satisfied by the substitution thereon of organic radicals. These compositions of matter may be prepared, for example, by the hydrolysis of hydrolyzable organo-substituted silanes, e. g., dihydrocarbon-substituted dihalogenosilanes, for instance, dimethyldichlorosilane, followed by complete or partial condensation of the hydrolysis product. They may also be prepared by hydrolyzing mixtures of hydrolyzable diorgano-substituted silanes among themselves or with hydrolyzable silanes containing, for example, three organic radicals substituted on the silicon atom, for instance, trimethylchlorosilane. More specific directions for the hydrolysis of hydrolyzable organo-substituted silanes to form liquid organo-substituted polysiloxanes may be found, e. g., in Patnode Patent 2,469,888 issued May 10, 1949, and Sprung and Wilcock Patent 2,483,158 issued September 27, 1949, both patents being assigned to the same assignee as the present invention.

By the term "hydrolyzable organo-substituted silanes" is intended to mean derivatives of $SiH_4$ which contain hydrolyzable groups or radicals, e. g., halogens, amino groups, alkoxy, aryloxy, and acyloxy radicals, etc., in addition to the organic groups substituted directly on the silicon atom that are joined to the silicon through carbon-silicon linkages. Examples of such organic radicals are aliphatic radicals, including alkyl radicals, e. g., methyl, ethyl, propyl, butyl, etc.; alicyclic radicals, e. g., cyclopentyl, cyclohexyl, etc.; aryl radicals, e. g., phenyl, diphenyl, anthracyl, naphthyl, etc.; aralkyl radicals, e. g., tolyl, xylyl, etc.; alkenyl radicals, etc., as well as hydrolyzable silanes containing two different organic radicals, e. g., methyl and phenyl radicals, etc., attached to the silicon atom. If desired, the above-mentioned radicals may also contain substituents substituted thereon, for instance, halogens.

Hydrolysis of the above silanes or mixtures of the silanes results in the formation of silanols, i. e., organo-substituted silanes containing hydroxy groups substituted directly on the silicon, which hydroxy groups almost immediately condense intermolecularly (intercondense) splitting out water to give the siloxane linkages mentioned previously. Such intercondensations are accelerated by acidic materials, e. g., sulfuric acid, hydrochloric acid, ferric chloride, etc., as well as by basic materials, e. g., sodium hydroxide, ammonium hydroxide, potassium hydroxide, etc. As a result of the hydrolysis and condensation, organopolysiloxanes may be produced which are partially or completely condensed and which may have on the average up to as high as three organic radicals substituted per silicon atom. The liquid organopolysiloxanes, i. e., liquid organosubstituted polysiloxanes, prepared in this manner consist essentially of silicon atoms joined together by oxygen atoms through silicon-oxygen linkages and organic radicals attached to silicon through carbon-silicon linkages, the remaining valences, if any, of the silicon atoms being satisfied by hydroxyl radicals and/or by residual unhydrolyzed radicals, such as the hydrolyzable radicals listed previously.

The viscosity of the liquid organopolysiloxanes obtained in the above fashion may vary, for instance, depending upon the starting materials, hydrolysis medium, temperature, etc. These materials have good resistance to the effect of heat for great lengths of time at temperatures of the order of 100° to 150° C. At these temperatures they resist decomposition much better for longer periods of operation than other organic non-silicon-containing liquid maerials, as, for example, mineral oils, organic esters, vegetable oils, etc.

Although organopolysiloxanes have good lubricity in many applications, it has been found that when such organopolysiloxane lubricants are employed in applications where a heavy load is placed on the bearing surfaces, there is a tendency for the liquid organopolysiloxane to be squeezed out. This is a serious defect since under such circumstances there may be a lack of protection against wear of the bearing members, and because of this lack of protection there may occur what is known as "freezing" or bearing seizure of the revolving member or shaft supported by the bearings. Generally petroleum base oils of similar viscosities are not subject to this defect. This disparity in lubrication properties of organopolysiloxanes is particularly pronounced where both rubbing surfaces are steel. The inability of the liquid organopolysiloxane to maintain a continuous lubricating film on the steel surfaces when the load on the bearings has been increased above a certain critical point is very serious, and in some measure has limited the usefulness of liquid organopolysiloxanes as lubricants.

The primary object of this invention is to provide liquid organopolysiloxane lubricants capable of adequately lubricating the bearing surfaces of moving metallic bodies even under increased loads, said liquids being characterized by high resistance to oxidation, little change of viscosity with temperature, and low pour points. Other objects and advantages of the present invention will become apparent from the following description and claims.

Unexpectedly I have now found that the frictional properties of liquid organo-substituted polysiloxanes, especially liquid hydrocarbon-substituted polysiloxanes containing an average of from about 1.9 to 2.67, more particularly from approximately 1.95 to 2.3 hydrocarbon groups per silicon atoms, may be greatly improved by incorporating in the said liquid polysiloxane a minor proportion, preferably a small amount, of an aliphatic compound containing both chlorine and fluorine atoms.

The aliphatic compounds containing both chlorine and fluorine in the molecule may be described generally as those having at least two carbon atoms, for example, from 2 to 20 carbon atoms or even more either in a ring, straight chain, or branched chain configuration, where chlorine and fluorine atoms are substituted on the same or different carbon atoms, the remaining valences of the carbon atoms being satisfied where required by hydrogen atoms. In many applications it is preferable that the aliphatic compounds employed in the practice of this invention have all the valences of the carbon atoms satisfied by chlorine and fluorine atoms. However, it is to be understood that I do not intend to limit the scope of my invention to such compounds since, as may be apparent to those skilled in the art, some of the valences of the carbon atoms may be satisfied by hydrogen.

Among the aliphatic hydrocarbon compounds containing chlorine and fluorine atoms which I may use may be mentioned, for example, 1,1,-dichloro-2,2-difluoroethane (including its various isomers), 1,1,1-trichloro-2,2,2-trifluoroethane as well as isomers of ethane containing the same number of chlorine or fluorine atoms but attached to the carbon atoms by a different configuration (for instance, $CF_2ClCCl_2F$, etc.), pentachlorotrifluoropropane including its various isomers (for example, $$CFCl_2CCl_2CClF_2$$

etc.), hexachlorodifluoropropane including its various isomers, trichlorotrifluoropropane including its various isomers (for example, 1,1,2-trichloro-3,3,3-trifluoropropane), $CHCl_2CClFCClF_2$, $CH_2ClCF_2CH_2Cl$, $$CClF_2CCl_2CClF_2$$

tetrachlorodifluoropropene including its various isomers (for example, 1,2,3,3-tetrachloro-1,1-difluoropropene-2), trichlorotrifluoropropene including its various isomers (for example, 1,1,1-trifluoro-2,3,3-trichloropropene-2), dichlorohexafluorobutene including its various isomers (for example, 1,1,1,3,3,3 - hexafluoro - 2,3 - difluorobutene-2), dichlorohexafluorocyclobutane, 1,2 - dichloro - 3,3,4,4,5,5-hexafluorocyclopentene-1, trichloropentafluorocyclohexadiene, $CF_2ClCFClCFClCF_2Cl$, $CF_3CCl=CClCF_3$, $$CHF_2CF_2CF_2CF_2Cl,$$

$C_7ClCF_{15}$, $C_7Cl_3F_{13}$, $C_7H_4F_{10}Cl_2$, $CF_2H(CF_2)_6CF_2Cl$, etc.

Among the aliphatic compounds containing both chlorine and fluorine which I have found especially applicable in my invention is a group of chlorinated fluorinated low molecular weight polymers known as "Fluorolubes." These compositions may be prepared by several methods. One method comprises polymerizing chlorotrifluoroethylene in the presence of small amounts of chloroform and by use of a catalyst such as benzoyl peroxide to yield what is known as "unstabilized low polymers" which contain benzoyl radicals and trichloromethyl radicals as chain-stopping units. This unstabilized polymer is then treated with cobalt trifluoride, during which process these unstable terminating groups are removed and replaced with trifluoromethyl groups. This stabilized polymer containing the recurring structural unit $(-CClF-CF_2-)_n$, where $n$ is an integer equal to at least 1, is a source of commercial Fluorolubes. By distillation of this heterogeneous polymer one obtains several products including what is known as a "foreshot" boiling between 50–100° C. at 1 mm., standard Fluorolube, boiling between 100–220° C. at 1 mm., and Fluorolube heavy grease which is the residue. One source of these Fluorolubes is the Hooker Chemical Corporation of Niagara Falls, N. Y.

The amount of additive which may be added to the liquid organopolysiloxane may be varied within wide limits without departing from the scope of the invention. Generally, a minor proportion is employed and preferably an amount of the additive is used which is soluble at normal temperatures in the liquid organopolysiloxane. A useful range which I have found can be employed for these additives is one ranging from about 0.5 to 25%, by weight, preferably from 1 to 10%, based on the weight of the liquid organopolysiloxane.

The lower molecular weight additives may generally be employed in greater amounts because of better solubility in the organopolysiloxane lubricants. Another consideration entering in the choice of the additive is dictated by the application for which the mixture of liquid organopolysiloxane and additive is intended. Where advantage is to be taken of the low temperature properties of the liquid organopolysiloxane it will be apparent that lower molecular weight additives having lower boiling points may be employed satisfactorily. In cases where the application is for high temperature use, it will be apparent that it is more desirable to use higher molecular weight aliphatic compounds containing fluorine and chlorine atoms therein in order to minimize the loss of additive at the elevated temperatures. In this respect the above-described Fluorolubes are eminently suitable because of their essential inertness at elevated temperatures and their low volatilities.

In order that those skilled in the art may better understand how the present invention may be practiced, the following examples are given by way of illustration and not by way of limitation. All parts are by weight.

In the following examples various additives comprising aliphatic compounds containing both chlorine and fluorine atoms were added to different organopolysiloxanes intended as lubricants and these mixtures were then tested for their lubricity properties on a Shell four ball wear tester which comprises a device for holding three rigidly clamped ½" metal balls submerged in a lubricant in a metal cup. A fourth rotating ball of the same diameter is then pressed into contact with the three stationary balls by an adjustable loading arm and allowed to rub for one hour. The contact points on the three stationary balls grow to circular scars as wear progresses. The average diameter of these scars in millimeters (mm.) after an hour's run at some particular speed and load is taken as the measurement of wear. The type of metal employed in the balls can be changed as, for example, the lubricating surfaces can be steel on steel, or steel on brass, or brass on steel.

EXAMPLE 1

In this example a methyl polysiloxane oil (viscosity of 70 centistokes) comprising a linear dimethyl polysiloxane chain-stopped at each end with trimethylsilyl groups and more particularly described in the aforementioned Patnode Patent 2,469,888, as well as in another Patnode Patent 2,469,890, was mixed with various chlorinated fluorinated aliphatic hydrocarbons in a certain proportion and each of the mixtures was tested on the above-described Shell four ball tester. The following Table I shows results of these tests when the rotating ball was rotating at a speed of about 600 R. P. M. for one hour and the load on the loading arm was about 10 kg. The values in the table below show wear scars where the surfaces were steel on steel and steel on brass, i. e., where the revolving ball is steel and the three stationary balls are brass.

Table I

| Additive (3%) | Steel, mm. | Brass, mm. |
| --- | --- | --- |
| None | .48 | 2.26 |
| $CFCl_2CFCl_2$ | .32 | .54 |
| $CF_2ClCCl_2F$ | .28 | .52 |
| $CFCl_2CCl_2CClF_2$ | .30 | .44 |
| $CFCl_2CCl_2CFCl_2$ | .32 | .55 |
| $CF_3ClCCl=CCl_2$ | .26 | .51 |
| $CF_3CCl=CCl_2$ | .24 | .52 |
| $CF_3CCl=CClCF_3$ | .26 | .57 |
| $CHCl_2CCl_2CClF_2$ | .27 | .51 |

EXAMPLE 2

In this example a chain-stopped methyl polysiloxane oil similar to the one employed in Example 1 but having a viscosity of about 40 centistokes was mixed with 10%, by weight, of a low boiling Fluorolube described earlier as the foreshot. Another sample of the same methyl polysiloxane oil was mixed with about 5%, by weight, thereof of standard Fluorolube. Each formulation was tested in the Shell four ball tester at room temperature and with 10 kg. load with and without additive varying the speed of the revolving ball at which each composition was tested. The following table shows the results of these tests:

Table II

| Additive | R. P. M. | Steel on Steel, mm. | Steel on Brass, mm. |
|---|---|---|---|
| None | 600 | .46 | 2.10 |
| Fluorolube (10%) Foreshot | 600 | .27 | .84 |
| None | 1,200 | .56 | 2.40 |
| Fluorolube (5%) Standard | 1,200 | .47 | .56 |
| Petroleum oil [1] | 600 | .53 | |
| Fluorolube (5%) Standard [1] | 600 | .55 | |
| Fluorolube (5%) Standard [2] | 600 | .68 | |

[1] Conducted at temperature of 150° C.
[2] Conducted at 150° C. with 30 kg. load.

It was noted that in each case where the Fluorolube was used, the wear scar was round and smooth whereas when no additive was employed the wear scar was oblong and deeply scarred.

EXAMPLE 3

In this example 5%, by weight, of the Fluorolube foreshot was added to a methyl phenyl polysiloxane oil containing terminal trimethyl silyl groups. There was also added to this oil 1%, by weight, thereof of a thio fatty acid having the formula $CH_3(CH_2)_{15}SCH_2COOH$ and 2%, by weight, based on the oil of a phosphite ester OS-1666 made by the Lubrizol Corporation, the last two additives being incorporated for the purpose of still further improving the lubricity of the mixture of the silicone oil and the Fluorolube. Testing of this mixture in the Shell four ball tester under a 15 kg. load at normal temperatures and at a speed of 1200 R. P. M. showed that for steel on steel the diameter of the wear scar was .66 mm. Under similar conditions testing of the oil with the two additives excluding the Fluorolube showed the oil to have a wear scar of 2.13 for steel on steel.

EXAMPLE 4

In this example, varying amounts of the above-mentioned Fluorolube foreshot were added to a chain-stopped methyl polysiloxane oil (40 centistokes) similar to that used in Example 2. The mixtures of methyl silicone oil and Fluorolube were tested in a Shell four ball tester which was run at around room temperature using a speed of 600 R. P. M. for 1 hour under varying loads as indicated in the table below. All the balls in the tester were steel balls.

Table III

| Percent Fluorolube Additive | Load (kg.) | Wear Scar (mm.) |
|---|---|---|
| 0.0 | 50 | 1.88 |
| 1.0 | 50 | 1.65 |
| 2.0 | 50 | 1.40 |
| 2.8 | 50 | 1.20 |
| 3.0 | 50 | 0.52 |
| 5.0 | 50 | 0.55 |
| 10.0 | 50 | 0.75 |
| 0.0 | 25 | 0.77 |
| 2.5 | 25 | 0.44 |
| 5.0 | 25 | 0.48 |

From the foregoing data, it is apparent that this particular additive is particularly useful in reducing wear at high loads and at additive concentrations ranging from about 1 to 5%, by weight.

From the foregoing examples, it will be clearly apparent that the lubricating properties of liquid organopolysiloxanes of the type employed in the practice of my invention can be markedly improved by incorporating therein aliphatic compounds containing both chlorine and fluorine atoms. By means of my invention lubricating films of liquid organopolysiloxanes can be maintained between rubbing bearing surfaces without excessive wear taking place. My invention also enables one to employ organopolysiloxanes as lubricants at high temperatures where ordinary petroleum oils are unsatisfactory.

It will, of course, be understood by those skilled in the art that other halogenated aliphatic compounds of the class described previously and of which many examples have been given earlier may be used in place of those employed in the preceding examples without departing from the scope of the invention. In addition, the percentages of the additives may also be varied depending on the solubility of the additive in the organopolysiloxane, the application for which the organopolysiloxane oil is intended, etc.

The use of the additives in accordance with my invention is especially adaptable for liquid organopolysiloxanes, for instance, the liquid alkyl-substituted polysiloxanes, e. g., liquid methyl-, ethyl-, propyl-, butyl-, isopropyl-substituted polysiloxanes, etc.; the liquid aryl-substituted polysiloxanes, e. g., the liquid phenyl-substituted polysiloxanes, etc.; the liquid organopolysiloxanes containing different hydrocarbons substituted on the silicon atom or atoms, e. g., liquid methyl- and phenyl-substituted polysiloxanes, etc., as well as liquid organopolysiloxanes containing both alkyl and aryl hydrocarbons substituted on different silicon atoms, e. g., liquid organopolysiloxanes obtained by hydrolyzing a mixture comprising dimethyldichlorosilane and diphenyldichlorosilane.

My claimed compositions can be used to make various greases using many of the thickening agents such as soaps ordinarily used for that purpose as thickening agents. These include, for instance, lithium stearate, lithium hydroxy stearate, etc. Other additives may be incorporated in the grease to improve certain properties thereof as, for example, the use of various oxidation inhibitors, organic diesters for improving low temperature properties [e. g., di-(2-ethylhexyl) sebacate], etc.

What I claim as new and desire to secure by Letters Patent of the United States is:

1. A composition of matter consisting essentially of (1) a major proportion of a liquid methyl polysiloxane containing an average of from 1.9 to 2.67 methyl groups per silicon atom and (2) from 1 to 10%, by weight, based on the weight of (1) of 1,1,2,2,3-pentachloro-1,3,3-trifluoropropane.

2. A composition of matter consisting essentially of (1) a major proportion of a liquid methyl polysiloxane containing an average of from 1.9 to 2.67 methyl groups per silicon atom and (2) from 1 to 10%, by weight, based on the weight of (1) of 1,1,2,2,3-pentachloro-3,3-difluoropropane.

3. A composition of matter consisting essentially of (1) a major proportion of a liquid methyl polysiloxane containing an average of from 1.9 to 2.67 methyl groups per silicon atom and (2) from 1 to 10%, by weight, based on the weight of (1) of 1,2,3,3-tetrachloro-1,1-difluoropropene-2.

4. A composition of matter consisting essentially of (1) a major proportion of a liquid methyl polysiloxane containing an average of from 1.9 to 2.67 methyl groups per silicon atom and (2) from 1 to 10%, by weight, based on the weight of (1) of 2,3-dichloro-1,1,1,4,4,4-hexafluorobutene-2.

5. A composition of matter consisting essentially of (1) a major proportion of a liquid organopolysiloxane and (2) up to 25%, by weight, based on the weight of the organopolysiloxane, of a linear, liquid, low molecular weight polymer of at most 20-carbon length consisting essentially of recurring, connected (—CClF—CF$_2$—) groups and boiling from 50° to 220° C. at 1 mm.

6. A composition of matter consisting essentially of (1) a major proportion of a liquid methylpolysiloxane containing an average of from 1.9 to 2.67 methyl groups per silicon atom and (2) from 1 to 10%, by weight, based on the weight of (1) of a linear, liquid, low molecular weight polymer of at most 20-carbon length consisting essentially of recurring, connected (—CClF—CF$_2$—) groups and boiling from 50° to 220° C. at 1 mm.

7. A composition of matter having grease-like properties and consisting essentially of (1) a major proportion of a liquid organopolysiloxane, (2) a thickening agent for (1) comprising a metallo-organic soap, and (3) a minor proportion in an amount up to 25%, by weight, based on the weight of (1), of a liquid, linear, low molecular weight polymer of at most 20-carbon length consisting essentially of recurring, connected (—CClF—CF$_2$—)

groups and boiling from 50° to 220° C. at 1 mm.

8. A composition of matter having grease-like properties and consisting essentially of (1) a major proportion of a liquid methylpolysiloxane, (2) a thickening agent for (1) comprising lithium stearate, and (3) a minor proportion up to 25%, by weight, based on the weight of (1) of a liquid, linear, low molecular weight polymer of at most 20-carbon length consisting essentially of recurring connected (—CClF—CF$_2$—) groups and boiling from 50° to 220° C. at 1 mm.

9. A composition of matter having grease like properties and consisting essentially of (1) a major proportion of a liquid methylpolysiloxane, (2) a thickening agent for (1) comprising lithium hydroxy stearate and (3) a minor proportion up to 25%, by weight, based on the weight of (1) of a liquid, linear, low molecular weight polymer of at most 20-carbon length consisting essentially of recurring connected (—CClF—CF$_2$—) and boiling from 50° to 220° C. at 1 mm.

10. A composition of matter consisting essentially of (1) a major proportion of a liquid organopolysiloxane and (2) a minor proportion in an amount up to 25%, by weight, of the weight of the organopolysiloxane, of a substituted aliphatic hydrocarbon compound containing both chlorine and fluorine and being selected from the class consisting of dichlorodifluoroethane, trichlortrifluoroethane, pentachlorotrifluoropropane, hexachlorodifluoropropane, trichlorotrifluoropropane, tetrachlorotrifluoropropane, dichlordifluoropropane, tetrachlorotetrafluoropropane, tetrachlorodifluoropropene, trichlorotrifluoropropene, dichlorohexafluorobutene, dichlorohexafluorocyclobutane, 1,2-dichloro-3,3,4,4,5,5-hexafluorocyclopentene-1, trichloropentafluorocyclohexadiene, tetrachlorohexafluorobutane, 1,1,1,3,3,3-hexafluoro-2,3-dichloropropene-2, decafluorochlorohexane, chloropentadecafluoroheptane, trichlorotridecafluoroheptane, dichlorodecafluoroheptane, chlorohexadecafluorooctane, and liquid, linear, low molecular weight polymers of at most 20-carbon atom length consisting essentially of recurring connected (—CClF—CF$_2$—)

groups and boiling from 50° to 220° C. at 1 mm.

References Cited in the file of this patent

UNITED STATES PATENTS

| | | |
|---|---|---|
| 2,318,684 | Gaylor | May 11, 1943 |
| 2,398,173 | Brunstrum et al. | Apr. 9, 1946 |
| 2,411,159 | Hanford | Nov. 19, 1946 |
| 2,471,850 | Wilcock | May 31, 1949 |

OTHER REFERENCES

Low Polymers of Chlorofluoroethylene by Miller et al., Ind. and Eng. Chem., 1947, vol. 39, No. 3, pages 333–337.